United States Patent [19]

Tabourier

[11] Patent Number: 5,020,126
[45] Date of Patent: May 28, 1991

[54] METHOD AND CIRCUIT FOR THE AUTOMATIC CONTROL OF THE SPEED OF A DC MOTOR BY THE CONTROL VOLTAGE OF THE MOTOR

[75] Inventor: Rémy Tabourier, L'Hay les Roses, France

[73] Assignee: Thomson-CSF, Puteaux, France

[21] Appl. No.: 469,046

[22] Filed: Jan. 23, 1990

[30] Foreign Application Priority Data

Jan. 27, 1989 [FR] France .................. 89 01008

[51] Int. Cl.$^5$ ............................................. H02P 5/00
[52] U.S. Cl. ..................................... 388/815; 318/504
[58] Field of Search ................... 380/815, 818, 821; 318/494, 504; 388/809, 810, 812–815

[56] References Cited

U.S. PATENT DOCUMENTS

| | | | |
|---|---|---|---|
| 3,046,464 | 7/1962 | Miller | 388/818 |
| 3,412,305 | 11/1968 | Kanner | 388/818 |
| 3,560,828 | 2/1971 | Kobayashi et al. | 388/818 |
| 3,568,027 | 11/1969 | Bacon | 388/818 X |
| 3,705,337 | 12/1972 | Grabl | 318/473 |
| 4,163,182 | 7/1979 | Tanikoshi | 388/818 |
| 4,303,874 | 12/1981 | Iwai | 388/818 X |
| 4,353,017 | 10/1982 | Burke, Jr. | 388/818 X |
| 4,645,991 | 2/1987 | Ban et al. | 388/818 |

FOREIGN PATENT DOCUMENTS

| | | |
|---|---|---|
| 1010116 | 5/1977 | Canada . |
| 228535 | 7/1987 | European Pat. Off. . |
| 3328250 | 3/1984 | Fed. Rep. of Germany . |
| 251618 | 11/1987 | German Democratic Rep. . |

Primary Examiner—William M. Shoop, Jr.
Assistant Examiner—David Martin
Attorney, Agent, or Firm—Oblon, Spivak, McClelland, Maier & Neustadt

[57] ABSTRACT

The method consists in mounting the armature of an motor in a bridge circuit and in injecting, at the input of a circuit for amplifying the supply of the bridge receiving the control voltage, an automatic control signal corresponding to the difference between the intensity feedback and the voltage feedback picked up at the terminals of the bridge. Upstream of the amplifier circuit, there is injected an AC voltage with a frequency greater than a cut-off frequency of the motor, the AC voltage generating an AC component of the above-mentioned automatic control signal representing a disequillibrium of the bridge due to a variation of the armature resistance. This AC component is used as a source of a control signal of the gain of an amplifier with adjustable gain of an intensity feedback present at one of the terminals of the bridge.

4 Claims, 2 Drawing Sheets

METHOD AND CIRCUIT FOR THE AUTOMATIC CONTROL OF THE SPEED OF A DC MOTOR BY THE CONTROL VOLTAGE OF THE MOTOR

BACKGROUND OF THE INVENTION

1. Field of the Invention

The invention concerns a method and circuit for the automatic control of the speed of a DC motor by the control voltage of the motor.

2. Description of the Prior Art

A standard method for achieving this automatic control makes use of the negative feedback of a tachometric generatrix. This negative feedback is a quantity representing the speed of the DC motor to which it is coupled. This method which is costly and, in certain applications, unsuitable because of the amount of space taken up by the tachometric generatrix called generator in the following description, has been replaced by the control method known as the "motional negative feedback" method.

This second method uses a bridge assembly, as illustrated by the diagram of FIG. 1, enabling access to the back electromotive force of the DC motor itself. This figure shows the motor 1 having an armature resistance r constituting one of the values of the four resistors r, s, p, g of the bridge 2 set up between the ground 3 and the outlet of a power amplifier 4 with a gain G. Between the terminals 5 and 6 for measuring the bridge 2, there is a first summator 7, the output signal (a voltage) of which corresponds to the difference between the potentials of the two terminals 5 and 6, the potential of the terminal 6, called an intensity feedback, being deducted from that of the terminal 5, called a voltage feedback. This output voltage is carried by an automatic control channel 8 to the input of the amplifier 4 where, by means of a second summator 9, it is deducted from the control voltage U also admitted at the input of the amplifier 4.

Computations show that in accurately choosing the resistance values of the resistors s, p and g for a given motor with a known armature resistance and for an amplifier with a given gain, this assembly makes it possible to obtain a speed proportionate solely to the control voltage U of the motor in a ratio where the effects of friction are notably reduced. Furthermore, by this arrangement, the electro-mechanical time constant is also reduced. This is particularly valuable when a fast response is desired (damping of a closed-loop servo-mechanism).

The limits of this device lie in the variation of the armature resistance r during operation. At a given temperature, namely that corresponding to the setting of the motor in accordance with a technical specification, the value of r is known and it is possible to provide for the conditions enabling a speed response from the motor that is proportionate to the control voltage U. However, in certain applications, the range of the temperatures in which the motor is made to function is very wide (sometimes wider than 100° C.), so much so that the value of r of the bridge 2 may vary broadly below, above or around its nominal value, leading to non-compliance with the condition resulting from the computation to obtain the linearity of the speed response of the motor. In certain cases, even computation shows that this variation may lead to an instability in the automatic control, and the motor may go into over-speed. To prevent this instability, we are led to choose resistance values of the bridge such that the performance characteristics of the system are deliberately reduced to provide for adequate safety at extreme temperatures.

The invention is designed to overcome these drawbacks by improving the automatic control and to improve the range of satisfactory operation of the system.

SUMMARY OF THE INVENTION

To this effect, therefore, a first object of the invention is a method for the automatic control of the speed of a DC motor by its control voltage, wherein the armature of the motor is mounted in a bridge circuit and, at the input of a circuit for amplifying the supply power of the bridge receiving the control voltage, there is injected an automatic control signal corresponding to the difference between the intensity feedback and the voltage feedback picked up at the terminals of the bridge, a method wherein, upstream of the amplifier, there is injected an AC voltage with a frequency greater than a cut-off frequency of the motor, the AC voltage generating an AC component of the above-mentioned automatic control signal representing a disiequilibrium of the bridge due to a variation of the armature resistance, and this AC component being used as a source of a control signal of the gain of an amplifier with adjustable gain of an intensity feedback present at one of the terminals of the bridge, or of the voltage feedback present at the other terminal.

The control signal of the gain is formed by a DC signal given in response to the detection of a part of the AC component of the automatic control signal which is in phase with the current flowing through the armature of the motor.

A second object of the invention is a device for the automatic control of the speed of a DC motor in accordance with the above method, comprising a bridge circuit wherein the armature of the motor forms a resistor, connected to the output of a power amplifier circuit, the measuring terminals of the bridge being connected to the inputs of a summator taking the difference between the voltage feedback present at one of the terminals and the current feedback present at the other terminal, the output of this summator being connected by an automatic control channel to one of the inputs of a second summator receiving the control voltage at its other input, the output of this second summator emitting the difference between the control voltage and the signal present at the automatic control channel towards the input of the amplification circuit.

According to the invention, this device includes a frequency generator connected to the input of the power amplifier circuit, an adjustable gain amplifier on either the current feedback measuring channel (preferably) or the voltage feedback measuring channel, a by-pass from the automatic control channel provided with a high-pass filter and including a device for detecting the AC component of the automatic control signal in phase with the current flowing through the armature of the motor, the output of which is connected to the gain control of the amplifier with adjustable gain. Furthermore, the automatic control channel has a low-pass filter upstream of the summator.

BRIEF DESCRIPTION OF THE DRAWINGS

The invention will be understood more clearly in the course of the following description of embodiments given below purely by way of indication and as non-restrictive examples which will make it possible to bring out its advantages and secondary characteristics.

The description will be made with reference to the appended drawings, wherein.

DETAILED DESCRIPTION OF THE INVENTION

Figure 1:
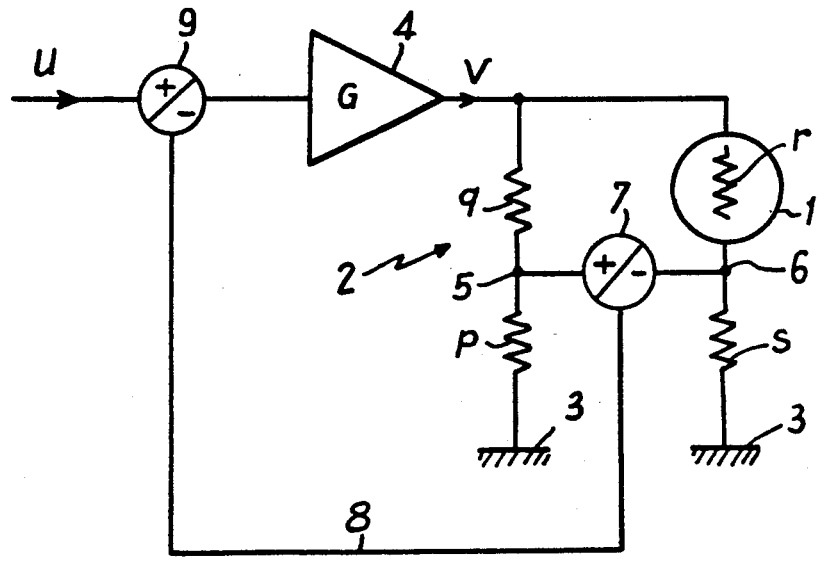
FIG. 1 is a diagram recalling the known device for control by motional negative feedback.

FIG. 2 again shows the elements already described in relation to FIG. 1 with the same references. At the input 30 to the amplifier 4, an AC voltage is injected by means of a generator 10. The frequency of this AC voltage is appreciably greater than the cut-off frequency of the motor 1 unit coupled to its load. It is recalled that this cut-off frequency is the one beyond which the speed of the motor is no longer controlled. Between the terminal 6 and the summator 7, an amplifier 11 with adjustable feedback is placed on the channel for measuring the current feedback of the bridge 2. The automatic control channel 8 has a low-pass filter 12 letting through only the useful frequencies of the automatic control signal (voltage). It has a bypass 13 fitted out with a high pass filter 14 that is connected to the input of a device 15 for detecting the AC component of the automatic control signal that comes from the summator 7 and is in phase with the current going through the armature of the motor 1. This component represents the value of the resistance r of this armature and enables the device 15 to give a control signal for the gain of the amplifier 11 in relation to the variation of this resistance.

It is therefore possible, by this means, to correct the value of the current feedback as a function of the variation of r to preserve a value, for the automatic control signal introduced at the input 30 of the amplifier 4, that maintains the constancy of the ratio between the motor speed and the control voltage U over a relatively wide range of temperatures.

To illustrate this result, we shall give below some design criteria which can be complied with by means of the device according to the invention.

In the case of FIG. 1, we have:
$V = Ri + e$, where
V is the output voltage of the amplifier 4,
R is equal to $r+s$,
e is the back electromotive force of the motor.

At the point 5 of the bridge 2, there is a voltage feedback equal to aV with:

$$a = \frac{p}{(p+q)}.$$

At the point 6 of the bridge, there is a current feedback equal to bRi, i being the intensity flowing through the armature of the motor and $$b = \frac{s}{(r+s)}.$$

If G is the gain of the amplifier 4, the following can be written:

$$[1/G + (a-b)]V = U - be = U - bkN,$$

where k is the torque coefficient or motor speed coefficient and N is the speed of the motor.

It is thus seen that U will be proportionate to N if $a + 1/G = b$.

Now, to keep this equation, it should be possible to know b which depends on r. The device 15 for controlling the gain of the amplifier 11 provides for this knowledge and applies a correction to the term bRi so as to keep it constant despite the variation of r. Since the function of the amplifier 11 with controlled gain is to seek the equilibrium of the bridge, from the viewpoint of the AC component of the signal coming from 7, this equilibrium could, less elegantly, be obtained by placing the amplifier 11 between the point 5 and the summator 7 (indicated at 11' in FIG. 2).

Figure 3:
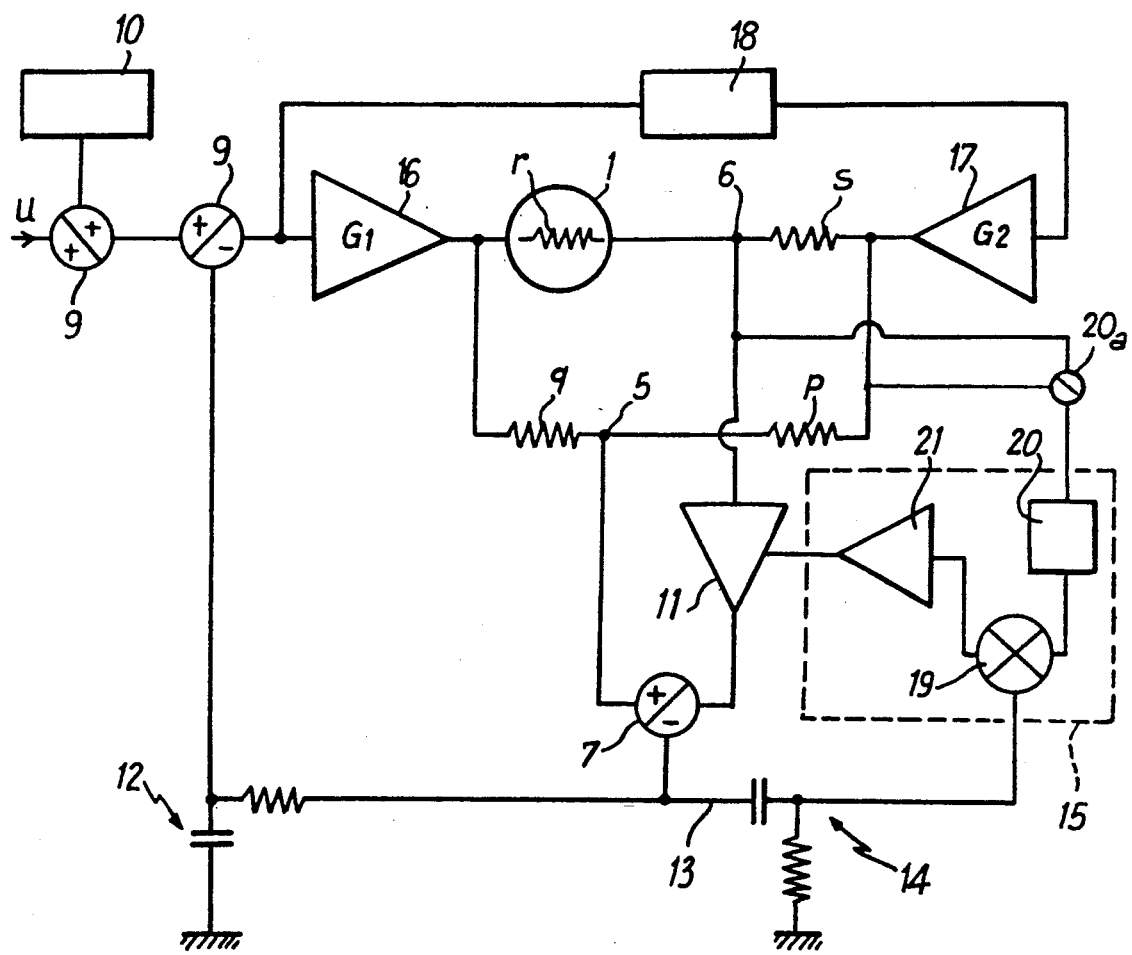
FIG. 3 is the diagram of a variant of the embodiment of FIG. 2.

An exemplary embodiment of the device 15 is shown in FIG. 3, where the motor is supplied by an amplifier circuit having two amplifiers 16, 17 (H type amplifiers), in a known way with a voltage inverter 18. This figure again shows the already described elements with the same references.

The device 15 includes an amplitude/phase demodulator 19 (known per se) which receives the AC component of the automatic control signal. This AC (voltage) component is phase-shifted with respect to the current owing to the self-inductance of the armature supplied with AC current. The other input of the demodulator 19 is supplied by the output of a limiter 20 which receives, at its input, the current differential feedback coming from a summator 20a placed at the terminals of the resistor s and delivers, at its output, towards the demodulator 19, a reference square signal enabling this demodulator to keep only the pure ohmic component of the voltage drop in the armature (in phase with the current) which represents the value of r. It is this component, amplified and possibly integrated by an amplifier (integrator) 21, that forms the control signal of the gain of the amplifier 11 with adjustable gain. It is seen that, by this device, the self-inductance of the armature has no effect on the measurement despite a possibly high frequency generated by the source 10.

Finally, it will be recalled that the electro-mechanical equations of the motor coupled to its load, for given friction values and for a given inertia, make it necessary for b to be always smaller than $$a + \frac{1}{G},$$

to prevent the instability of the automatic control which was recalled in the introduction. This constraint makes it necessary not to seek the perfect equation $$a + \frac{1}{G} = b.$$

To be certain that this constraint is not infringed, the measurement can be falsified by the device 15 by introducing a zero error at the amplifier 21, or the gain in voltage G of the amplifier 4 can be limited either by construction or by creating a second voltage feedback path 22 (FIG. 2), which escapes control but is perfectly known.

Figure 2:
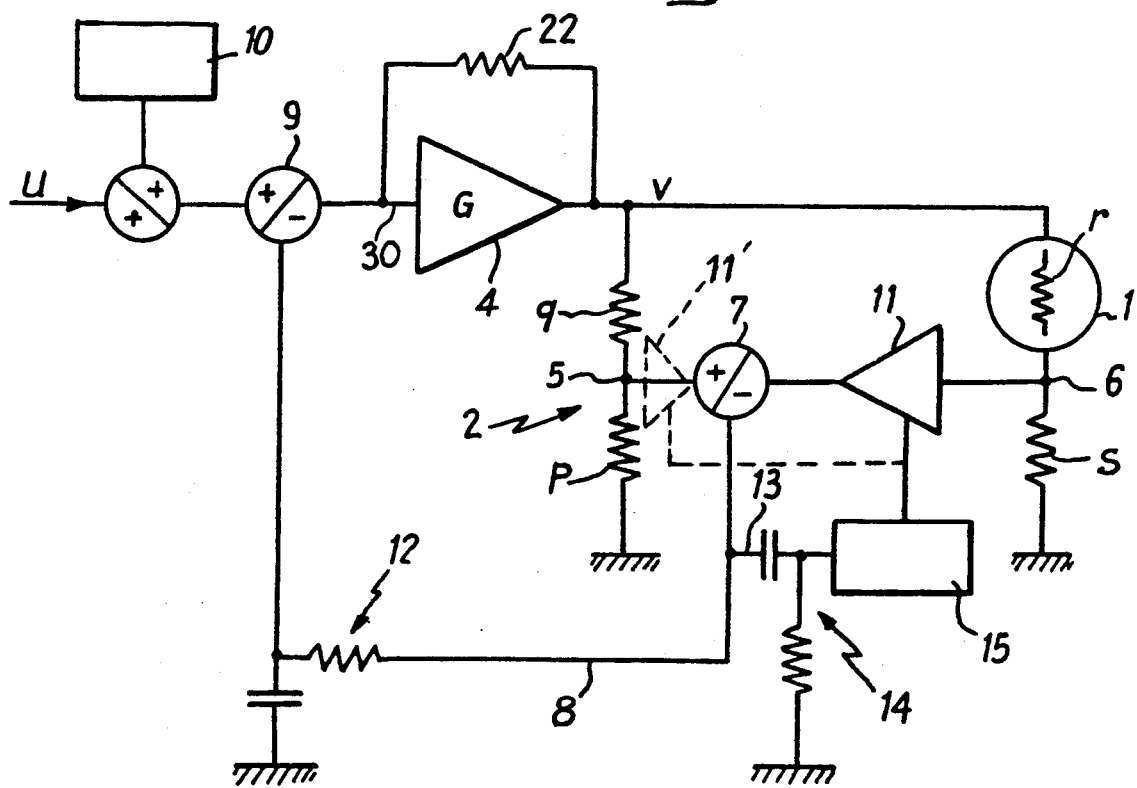
FIG. 2 is a diagram illustrating an embodiment of the invention.

The device 15, as shown in FIG. 2, may be a simple amplitude detection device, hence one without reference to the current flowing through the motor, if the frequency injected by the generator 10 is between the electrical cut-off frequency of the motor and the speed automatic control cut-off frequency, and if these three frequencies are appreciably distinct.

The invention has valuable applications in all instances where speed control is required and where the use of a motional negative feedback is either sufficient or constitutes the only possible approach. The invention makes it possible to improve the performance characteristics thereof because it makes it possible to improve the precision of the control by reducing the effect of the friction, or to improve the pass band by reducing the effect of the inertia of the load. This latter improvement is particularly useful for the damping of servo-mechanisms.

What is claimed is:

1. A method for automatically controlling a speed of a DC motor by a control voltage, wherein an armature of the DC motor is mounted in a bridge circuit and an input of a circuit for amplifying an input signal to the bridge circuit receives the control voltage and an automatic control signal corresponding to a difference between an intensity feedback signal and a voltage feedback signal picked up at first and second measuring terminals of the bridge circuit, the method comprising the steps of:

summing an AC voltage having a frequency greater than a cut-off frequency of the motor with said control voltage, said AC voltage generating an AC component of the automatic control signal representing a disequilibrium of the bridge due to a variation of the armature resistance; and utilizing this AC component as a source of a control signal for a gain of an amplifier with an adjustable gain which amplifies an intensity feedback present at a first terminal of the bridge circuit, or a voltage feedback present at a second terminal of the bridge circuit.

2. A method according to claim 1, wherein the control signal of the gain of the amplifier with adjustable gain is formed by a part of the AC component of the automatic control signal which is in phase with the current flowing through the motor.

3. A device for the automatic control of a speed of a DC motor having an armature which forms a resistor, comprising:

a bridge circuit connected to an output of a circuit for amplifying, wherein first and second measuring terminals of the bridge circuit are connected to inputs of a first summator which takes a difference between a voltage feedback signal present at the first terminal and an intensity feedback signal present at the second terminal, the output of this summator being connected by an automatic control channel to a first input of a second summator, a second input of which receives the control voltage input, said second summator emitting, at its output, towards the amplifying circuit, a difference between the control voltage input and the signal present at the automatic control channel;

a frequency generator connected to an input of the amplifying circuit;

an adjustable gain amplifier on one of the measuring channels of the bridge; and a bypass from the automatic control signal in phase with current flowing through the armature of the motor, the output of which is connected to the gain control of the amplifier with an adjustable gain.

4. A device according to claim 3, wherein the automatic control channel has a low-pass filter.

* * * * *